United States Patent [19]

Saiia

[11] Patent Number: 4,606,178

[45] Date of Patent: Aug. 19, 1986

[54] LAWNMOWER REEL-TO-BEDKNIFE ADJUSTMENT SYSTEM

[75] Inventor: Anthony J. Saiia, South Milwaukee, Wis.

[73] Assignee: Textron Inc., Providence, R.I.

[21] Appl. No.: 685,484

[22] Filed: Dec. 24, 1984

[51] Int. Cl.⁴ ............................................ A01D 55/20
[52] U.S. Cl. ........................................ 56/249; 56/7; 241/241; 83/74
[58] Field of Search ............... 56/6, 7, 10.2, DIG. 15, 56/249; 83/72, 74; 241/222, 239, 240, 241, 286, 287

[56] References Cited

U.S. PATENT DOCUMENTS

| | | | |
|---|---|---|---|
| 2,341,913 | 2/1944 | Fields | 56/249 |
| 3,187,492 | 6/1965 | Bergen | 56/249 |
| 3,680,293 | 8/1972 | Klemenhagen | 56/249 |
| 3,995,783 | 12/1976 | Bertrand et al. | 241/222 |
| 4,335,569 | 6/1982 | Keeney et al. | 56/249 |
| 4,345,419 | 8/1982 | Chandler | 56/249 |
| 4,516,388 | 5/1985 | Chandler | 56/249 |

FOREIGN PATENT DOCUMENTS 1944325 3/1971 Fed. Rep. of Germany ........ 56/249

OTHER PUBLICATIONS

Automotive Vehicle Brake Discs (Dimensions and Installation Data), 1 page.

Primary Examiner—Robert Peshock
Assistant Examiner—John G. Weiss
Attorney, Agent, or Firm—Arthur J. Hansmann

[57] ABSTRACT

A lawnmower reel-to-bedknife adjustment system wherein the bedknife cutting edge can be automatically positioned relative to the circumference of the cutting reel. An extendable and retractable link is connected to the pivotal bedknife at a numerical advantage relative to the pivot axis and thereby provide for a fine adjustment of clearance between the reel and the bedknife upon extension and contraction of the link. The link can be extended by fluid pressure, or the like, and it can be retracted by spring pressure, and a yielding force is arranged to establish the clearance to a pre-set condition each time. Also, a manual threaded adjustment is provided along the adjustment link so that manual adjustment can be accomplished when desired.

18 Claims, 4 Drawing Figures

LAWNMOWER REEL-TO-BEDKNIFE ADJUSTMENT SYSTEM

This invention relates to a lawnmower reel-to-bedknife adjustment system, and, more particularly, it relates to an adjustment system whereby a specified clearance between the reel and bedknife can readily be achieved

BACKGROUND OF THE INVENTION

Adjustable bedknives for reel-type lawnmowers are commonly known. It is the purpose of those mowers to have a slight clearance between the rotating cutting reel and the bedknife. The bedknife is commonly movable toward and away from the reel to present a cutting edge against which the reel rotates and thereby operates to cut the grass. The prior art is already aware of various adjustments for adjusting the bedknife relative to the reel and thus establish the desired clearance for optimum cutting. Examples of the prior art are found in U.S. Pat. Nos. 3,187,492 and 3,680,293 and 4,335,569 and 4,345,419. The first three of said patents show pivotally mounted bedknives controlled by threaded members to thereby be positioned with their cutting edges relative to the rotating reel. The last said patent shows a fixed bedknife with a movable reel and with a piston type of fluid dampener controlling the reel.

The present invention differs from the prior art in that it provides for a bedknife-to-reel adjustment system whereby the bedknife cutting edge can always be positioned at a desired specified small tolerance or clearance relative to the cutting edge of the reel itself. That is, the bedknife can be adjustably moved into actual contact with the reel cutting edge, and then there is an automatic further movement of the bedknife to attain the desired small clearance of the bedknife cutting edge with respect to the cutting edges of the reel, as desired. The small clearance is automatically attained by virtue of the mechanics of the adjustment system itself, and it need not be manually achieved, and it is therefore consistent and accurate. Still further, the small clearance can be controlled and set at determined magnitudes, and then it is again automatically attained according to the setting.

The present invention provides for an on-the-job adjustment or setting, in accordance with the desires of the operator. Also, the entire system is capable of releasing the bedknife when debris, such as sticks and stones, become lodged between the bedknife and the reel, and thereby avoid dulling or any damage to the cutting edges.

An important aspect of this invention is the provision of the adjustment system mentioned and whereby the adjustment is automatically achieved in a very small or minute dimension, such as 0.001 to 0.003 inches, to thus provide for the optimum adjustment and avoid excessive wear between the respective cutting edges and to yet assure that the grass will be well mowed.

DETAILED DESCRIPTION OF THE PREFERRED EMBODIMENTS

Figure 3:
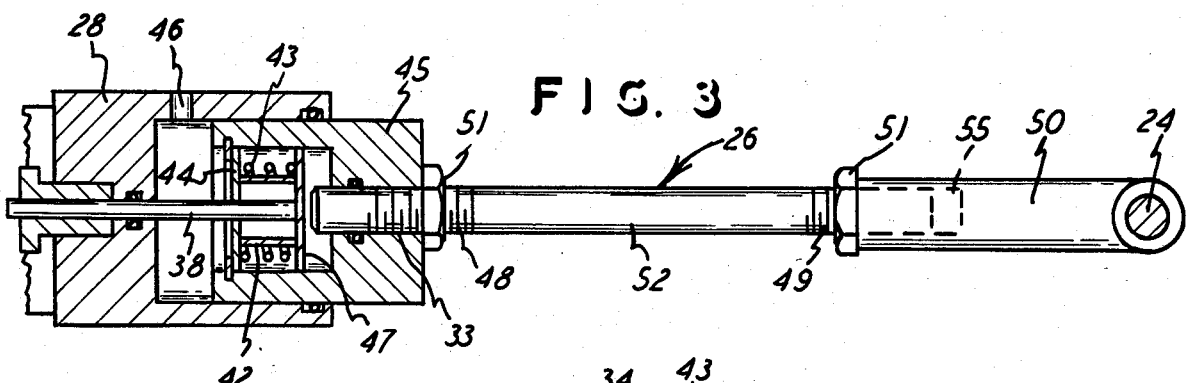
FIG. 3 is an enlarged side-elevational view of a slightly different embodiment from that shown in FIG. 1, but showing a fragment thereof, and likewise for FIG. 4.

The invention pertains to a conventional type of reel lawn mower having a wheel 10 and a ground engaging roller 11, both of which ride on the ground designated by the line G. A conventional type of cutting reel is designated at 12 and shown in its circumference in dot-dash lines, and it would present a cutting edge at the circumference 13, in a conventional manner. A mower frame 14 is shown in dot-dash lines and rotatably supports the wheel 10 and the reel 12 and the roller 11, all in the conventional arrangement which will be well understood by anyone skilled in the art.

A bedknife, generally designated 16, is pivotally mounted on the frame 14 on a pivot axle 17. The bedknife 16 has an elongated upstanding portion 18 and a shorter and generally horizontally extending portion 19. A bedknife cutting surface or edge 21 is shown adjacent the reel circumference 13, and there is a slight dimensional clearance designated C between the reel 12 and the cutting edge 21 of the bedknife 16. The reel 12 is on a fixed axle 22, but the bedknife 16 will pivot about its pivot mounting 17 so that the bedknife cutting edge 21 can move toward and away from the reel circumference 13 for establishing the clearance C relative to the reel 12. Of course the cutting edge 21 extends across the width of the mower, as does the reel 12 also, all in the conventional arrangement.

Figure 1:
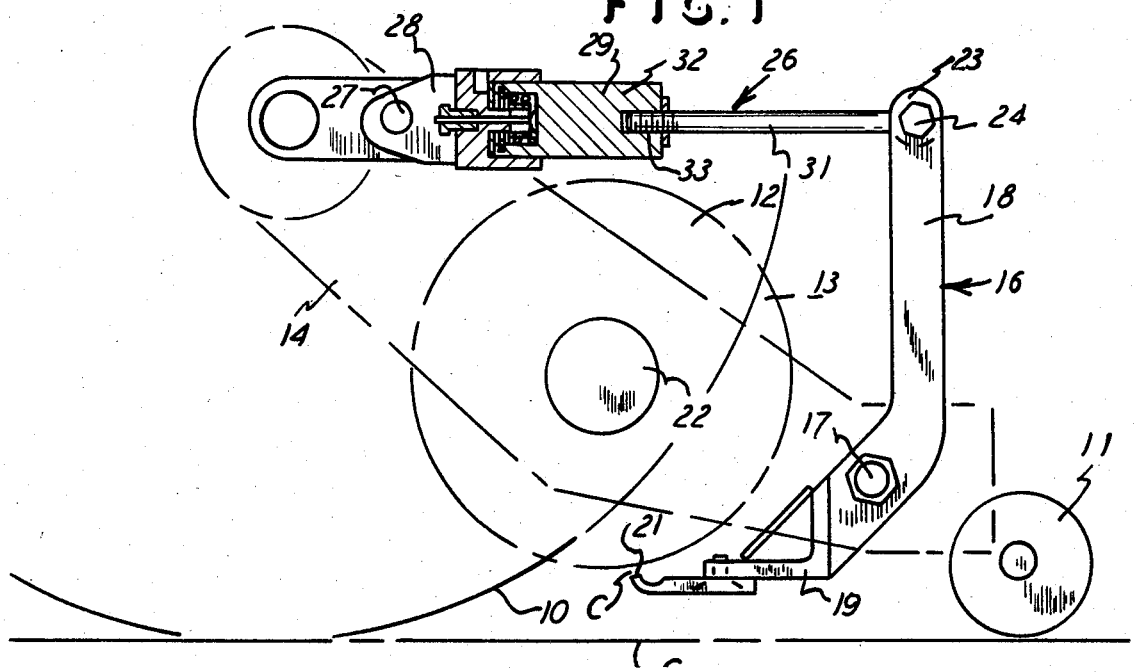
FIG. 1 is side elevational view of a preferred embodiment of this invention.

Therefore, movement of the bedknife upper end 23 in the left and right direction, as viewed in FIG. 1, will pivot the bedknife 16 about its pivot member 17 to thus move the cutting edge 21 toward and away from the reel cutting edge or circumference 13. It will be further noted that the dimension between the pivot member 17 and the bedknife cutting edge 21 is substantially less than the dimension between the pivot member 17 and a pivot connecting member 24 at the bedknife upper end 23. Thus, only slight movement of the pivot connector 24 will induce even less movement of the bedknife cutting edge 21, and thus very fine adjustment of the cutting edge 21 relative to the reel circumference 13 can be achieved, as desired. As shown, the difference in the aforementioned dimensions from the pivot member 17 are approximately in a ratio of one to two. Thus, one increment of movement of the connector 24 will induce approximately only one-half of that movement at the cutting edge 21 to create the fine adjustment desired.

A link or connector 26 is shown pivotally connected with the connective member 24, at one end of the link 26, and the other end of the link 26 is pivotally connected with a pivot connector 27 on the frame 14. Thus, the link 26 is articularly connected at its opposite ends between the bedknife 16 and the mower frame 14. Further, the link 26 is in two parts 28 and 29 which can move toward and away from each other to create an extension and retraction of the overall length of the link 26 and thus induce the pivot movement of the bedknife 16, as mentioned. Also, the link part 29 includes a rod 31 and a piston member 32, with the parts 31 and 32 being threaded together, at 33, and thus being further extendable and retractable by means of the screw threads 33 to provide for a manual adjustment of the overall length of the part 29.

Figure 2:
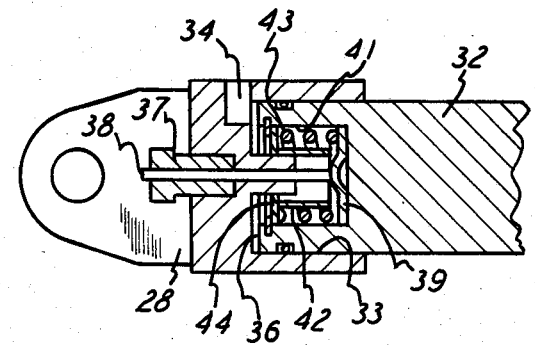
FIG. 2 is an enlarged side-elevational view of a fragment of FIG. 1.

FIG. 2 shows the part 32 is slidable in a piston chamber 35 in the part 28, to thus form a piston and cylinder arrangement between the parts 32 and 28. A fluid inlet opening 34 extends into the part 28 and to the chamber 35 to permit fluid under pressure to reach the end wall 36 of the piston member 32 and thus move the piston member 32 to the right, relative to the part 28, and thereby increase the length of the link 26 between its articular mountings 27 and 24.

The part 28 also carries a collet-type screw member 37 which is threaded into the member 28 and clamps upon a rod 38 extending therethrough and which is connected to an end plate 39 within a chamber 41 in the part 32. Thus, in a conventional collet arrangement, the rod 38 can be yieldingly held by the screw-type collet member 37 to thus yieldingly position the end plate 39. A cylindrical member 42 is freely disposed in the chamber 41 which also contains a compression spring 43 which abutts the end plate 39 and another plate 44, as shown. With that arrangement, when fluid is applied to the piston part 32, including against the surface 36, the piston 32 moves to the right and likewise displaces the end plate 44 and the spacer sleeve 42 to contact the end plate 39 and possibly move it to the right also, depending upon dimensional settings. Any movement of the plate 39 would be permitted by the rod 38 sliding in the friction-tight holding, but yieldable holding, of the collet 37. That condition might be as then shown in FIG. 3. Next, upon release of the fluid pressure, the spring 43 will be based upon the end plate 39 and will force upon the end plate 44 to return the piston 32 to the left, and the piston part 32 is then moved against the end plate or stop 39, as shown in FIG. 2. The dimensional relationships of those parts are such that the clearance C is then developed between the reel 13 and the bedknife cutting edge 21. The actual arrangement of the assembly, as shown in FIG. 2 is that which is already utilized in vehicle brake assemblies.

FIG. 3 also shows that arrangement for the link 26, and it too would operate with a fluid pressure entering at an inlet 46 in the member 28, and again the collet rod 38 is attached with the end plate or stop now designated 47, as described in FIG. 2. In both instances, the cylindrical spacer tube 42 determines the amount that the end plates 39 and 47 will travel, if they travel at all, when fluid pressure is applied, and thus dimension tolerance, wear, and the like are accomodated and the same desired clearance C is always established when the adjustment is made as described. FIG. 3 shows that the spacer tube 42 is already contacting the adjustable stop 47, and thus the link 26 would continue to extend until the bedknife cutting edge 21 contacts the reel circumference 13. Upon release of the fluid pressure, then the link 26 would contract, by having the spring 43 return the piston part 45 to the left, to establish the preset clearance C, as mentioned.

FIG. 3 also shows that the link part 29 has two threaded adjustments at 48 and 49, and these of course can be of opposite threading so that upon loosening the lock nuts 51, the double threaded rod 52 can be turned to extend or contract the overall length of the link 26 and thereby provide a manual adjustment for the setting of the cutting edge 21 in the context described herein.

It will be further seen and understood that when debris, such as stone, sticks, or the like become embedded between the reel 12 and the bedknife cutting edge 21, the assembly will permit adjustment by permitting pivoting of the bedknife 16 and contraction of the link 26 when the collet rod 38 overcomes the frictional force of the collet 37. Of course, the setting of the parts, prior to upset by the aforementioned debris, can be readily achieved by re-applying the fluid pressure and releasing same to establish the clearance C once again. Further, the tightening of the collet 37 can be achieved in order to permit the frictional holding of the rod 38, for the purposes mentioned and desired in this overall assembly.

Since the upstanding portion 18 of the bedknife 16 is of a substantially greater length than the bedknife portion from the pivot mounting 17 to the cutting edge 21, the clearance C can be minutely established since perhaps only half the displacement of the link 26 is reflected in the movement of the cutting edge 21, as previously mentioned. In actuality, a clearance of only 0.001 to 0.003 inches can be readily achieved by this arrangement, and that is desirable. The initial clearance C can be pre-set or shimmed at the assembly, to give the desired bedknife clearance within the context described herein. Also, since the resisting force created by the collet 37 must be sufficient to maintain the bedknife clearance against heavy cutting loads at the reel, but it must also allow movement when the cylinder is pressurized, again the large numerical ratio of the bedknife portion 18 to the portion 19 is an advantage.

It will be seen and understood that the drawings, particularly FIG. 3, also show that there is a part 45 which contains the spacer 42 and the spring 43, and it is threaded at 33 for adjusting the length of the link 26. Also, link 26 includes a part 50 which is threaded opposite at 55 and receives the part 52.

Figure 4:
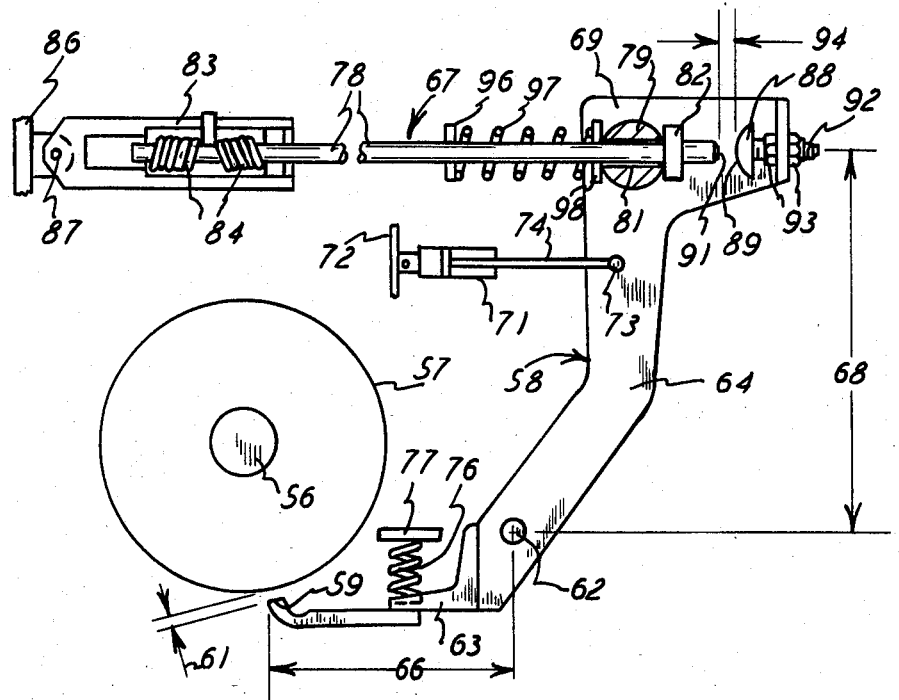

The embodiment of FIG. 4 shows the conventional mower reel shaft 56, and the reel itself is conventional and is indicated by the solid circle 57. The bedknife is generally designated 58, and it includes the cutting edge 59 which is adjacent the reel 57 and is shown to have a clearance therewith and designated 61, and that can be the desired mowing clearance. The bedknife 58 is suitably and pivotally mounted on the mower conventional frame by means of a pivot pin 62, for instance. The bedknife 58 includes the generally horizontally extending portion 63 and the generally upright or vertically extending portion 64. It will also be noticed that the portion 63 is indicated to have a smaller dimension from the pivot pin 62 to the cutting edge 59, and designated 66, compared to the larger dimension from the pivot pin 62 and to the upper portion of the bedknife 58 where there is a control member designated 67, and that larger dimension is designated 68. Just as in connection with the embodiment of FIG. 1, with the larger dimension 68, a movement of the bedknife upper portion 69 will create a smaller movement of the cutting edge 59, and thus the fine or small adjustment of the clearance 61 is attainable, as desired.

A fluid cylinder assembly 71 is mounted on the mower frame portion 72 and is attached at 73 to the bedknife 58. It will therefore be seen and understood by anyone skilled in the art that extension and retraction of the fluid assembly rod 74 will cause the bedknife 58 to pivot about its mounting pin 62. Of course the operator will have control over the assembly 71 to induce the bedknife pivot action mentioned. Also, a relatively heavy spring 76 extends between the bedknife portion 63 and the mower frame 77 to bear downwardly on the portion 63 and thereby induce counterclockwise rotation of the bedknife 58 about the pin 62, as viewed in FIG. 4.

The link or connector generally designated 67 includes a rod 78 connected to the bedknife upper portion 69 by extending through a lug 79 affixed to the bedknife portion 69 and having an opening 81 for slidably receiving the rod 78. A collar 82 is on the end of the rod 78 and abuts the lug 79 on the right thereof, as viewed in FIG. 4. It will therefore be understood that when the bedknife 58 is pivoted clockwise, then the rod 78 will move to the right as the lug 79 moves against the collar 82.

The link or connector 67 is restricted in its movement leftward, as viewed in FIG. 4, by means of the one directional mechanism designated 83, and that being a conventional one-way mechanical lock such as shown in U.S. Pat. No. 3,874,480. In that instance, the rod 78 is free to move to the right, in a conventional manner for that mechanism 83, but, coil springs 84 on the rod 78 preclude easy movement of the rod 78 to the left and relative to the portion 83. That is, the rod 78 can slip to the right, but there is a resistance against its movement to the left since the coil springs 84 provide that leftward movement resistance. Of course the connector 67 is mounted on the mower frame portion 86 through the pivot pin 87 connecting to the mechanical lock 83, as shown.

With that arrangement, clockwise rotation of the bedknife 58 move the rod 78 to the right, and that movement continues until the cutting edge 59 abuts the reel 57, and that movement was induced by the extension of the fluid assembly 71, for instance. When pressure is released in the assembly 71, then the spring 76 will induce the counterclockwise rotation mentioned for the bedknife 58, and that will cause an adjustable stop 88 to have its surface 89 abut the end 91 of the rod 78 which is now being held in its rightwardly fixed position, as mentioned. When the bedknife 58 has rotated counterclockwise to the position where the stop 88 abuts the rod 78, then the clearance 61, for instance, will have been established, as desired. It will of course be seen and understood that the stop 88 is adjustable in that it is threaded at 92 and is secured to the bedknife 58 by nuts 93. Therefore, an initial clearance designated 94 can be established between the rod end 91 and the stop surface 89, and that clearance would actually only exist when the cutting edge 59 is abutting the reel 57. Subsequently, as mentioned, the counterclockwise rotation of the bedknife 58 will cause the stop surface 89 to abut the rod end 91 and thereby create the cutting clearance 61.

Of course different mechanisms could be employed for the one directional movement of the connector 67, such as the rightward movement of the rod 68 as described, and the mechanism 83 could therefore be replaced by these different and conventional mechanisms, such as a sprag which would operate on a rotational principle which anyone skilled in the art will readily understand. In any event, the concept is that the connector 67 will move in the one direction, to the right as viewed in FIG. 4, but resist direction in the opposite direction, and thus provide the positioning of the cutting edge 59 under the influence of the spring 76 when the stop 88 abuts the rod end 91, all as mentioned.

Further, just as with regard to the previous embodiment, if debris or the like comes between the cutting edge 59 and the reel 57, then the bedknife 58 can rotate counterclockwise and the rod 78 will actually be forced against the resisting springs 84 to permit that rotation and thereby avoid damage to the mower. Further, a fixed collar 96 on the rod 78 provides a base for a spring 97 which abuts a sliding collar 98 on the rod 78 to thereby maintain the rod 78 relative to the lug 79, as shown.

The invention also includes the method of establishing a clearance at a location remote from the cutting members cutting edges, and that clearance is then proportionately transferred to the location between the cutting edges, to establish the final clearance therebetween. Therefore, in FIGS. 1 through 3, the initial clearance is first established in the connections, including the link 26, by virtue of the distance that the member 32 moves relative to the member 28, in FIG. 2 and when fluid pressure is applied in the chamber 41. With fluid pressure applied, per FIG. 3, spacer 42 moves stop 47 to the right and until the cutting edges 13 and 21 are in contact. Release of fluid pressure permits spring 43 to move members 32 or 45 to the left, to the position of FIG. 2, in lost motion action. As seen in FIG. 2, that lost motion is the clearance shown between the plate 39 and the adjacent end of the cylindrical sleeve 42. Of course when there is that clearance at that remote location as shown in FIG. 2, and also as shown in FIG. 4 and designated 94, then the cutting edges 13 and 21 are spaced apart. Therefore, the remote or initial clearance is proportionately transferred to the location between the cutting edges, to thereby provide the clearance "C" in FIG. 1 and the clearance 61 in FIG. 4, both as the final and desired clearance.

What is claimed is:

1. In a lawn mower of the type including a mower frame, two cutting members mounted on said frame and consisting of a cutting reel and a bedknife with both having cutting edges and with one of said cutting members being pivotally mounted and having a pivot axis, to be movable toward and away from the other of said cutting members to thereby establish a clearance between said cutting edges, the improvement comprising a link having one end articularly connected with said one of said cutting members at a location thereon to one side of said pivot axis, the other end of said link being articularly mounted relative to said frame, said link including two relatively movable pieces in end-to-end relationship and movable toward and away from each other in lost motion for extension and contraction of the overall length of said link, the distance of said lost motion in said link being proportional to the desired clearance between said cutting edges, means for extending said link to pivot said one of said cutting members about said pivot axis and thus move said one of said cutting members into contact with the other of said cutting members, a spring operative between said frame and said one of said cutting members through said lost motion for yieldingly urging said cutting edge away from said other of said cutting members and thereby proportionately transfer said lost motion distance to between said cutting edges, and a stop operative on said one of said cutting members for limiting movement of its said cutting edge in its movement away from said other of said cutting members.

2. The lawn mower as claimed in claim 1, including means on said link for adjusting the length of said link independent of the aforesaid extendable and contractable feature of said link for setting the clearance of said bedknife with said reel.

3. The lawn mower as claimed in claim 1, including a yieldable connector connected between said link and said frame and arranged to be yieldable in response to a force between said cutting members to thereby allow said cutting members to move apart when debris is between said bedknife and said reel.

4. The lawn mower as claimed in claim 3, including means on said link for adjusting the length of said link independent of the aforesaid extendable and contractable feature of said link for setting the clearance of said cutting members.

5. In a lawn mower of the type including a mower frame, two cutting members consisting of a cutting reel and a bedknife mounted on said frame, one of said cutting members being mounted on a pivot member having a pivot axis, said cutting members having cutting edges movable toward and away from each other upon pivot movement of said one of said cutting members to thereby establish the amount of clearance between said cutting edges, the improvement comprising a link having one end operatively associated with said one of said cutting members at a location thereon spaced a distance from said pivot axis, the other end of said link being mounted relative to said frame, said link being free to move in one direction for moving said one of said cutting members toward the other of said cutting members and being restricted against movement in the direction opposite said one member to thereby move and pivot said one of said cutting members about said pivot axis and thus adjust the clearance between said cutting edges, a stop adjacent said link to define a clearance with said link when said link is moved in the direction opposite to said one direction and for engaging said link to limit movement of said link in said one direction to thereby proportionately translate said clearance to be between said cutting edges, and a spring operatively associated with said one of said cutting members for pivoting said one of said cutting members in the direction to move said cutting edges apart, and thereby establish a clearance between said cutting edges when said link engages said stop.

6. The lawn mower as claimed in claim 5, wherein said stop is adjustable for adjustably establishing said clearance between said cutting edges.

7. The lawn mower as claimed in claim 5, including hydraulic means for pivotally moving said one of said cutting members toward said other of said cutting members.

8. The lawn mower as claimed in claim 5, including a releasable holding member operatively connected with said link for allowing extension of said link and resisting contraction of said link.

9. The lawn mower as claimed in claim 5, including a one-way operative holding member operatively connected with said link for allowing extension of said link and resisting contraction of said link.

10. In a lawn mower of the type including a mower frame, cutting members with cutting edges and consisting of a cutting reel and a bedknife and a pivot member all mounted on said frame, one of said cutting members being pivotally mounted on said pivot member disposed medially thereon and having a pivot axis for movement toward and away from the other of said cutting members to thereby establish the amount of clearance between said cutting edges, the improvement comprising said one of said cutting members including an upstanding portion extending from said pivot axis and including a horizontally extending portion extending from said pivot axis and presenting said cutting edge, a link having one end articularly connected to said one of said cutting members and having its other end articularly connected relative to said frame, said link being extendable and contractable through a lost motion in its length and between the said two articular connections for establishing the clearance between said cutting edges in an amount dependent upon said lost motion, a fluid chamber incorporated in said link for extending said link, a stop operative on said link for limiting the contraction of said link, and means operative on said link for contracting said link against fluid force in said chamber, to thereby set the clearance between said cutting edges.

11. The lawn mower as claimed in claim 10, including means on said link for adjusting the length of said link independent of the aforesaid extendable and contractable feature of said link for setting the clearance between said cutting edges.

12. The lawn mower as claimed in claim 10, including a yieldable connector connected between said link and said frame and arranged to be yieldable in response to a force between said bed-knife and said reel to thereby allow said cutting members to move apart when debris is between said bed-knife and said reel.

13. The lawn mower as claimed in claim 12, including means on said link for adjusting the length of said link independent of the aforesaid extendable and contractable feature of said link for setting the clearance between said cutting edges.

14. In a method on a lawn mower for establishing clearance between cutting edges on a rotating lawn mower reel and a lawn mower bedknife, one of the latter two being movable toward and away from the other, the improvement comprising the steps of establishing an intial clearance on the lawn mower at a location thereon remote from the cutting edges and with respect to and through connections to the aforesaid movable one of said reel and said bedknife and when said cutting edges are in contact with each other, and actuating said connections through the distance of said clearance and to a set limit position, thereby moving said cutting edges away from each other to a final desired clearance.

15. In the method as claimed in claim 14, including the step of arranging a stop in a set position spaced from said connections when said cutting edges are in contact with each other, fo establishing said initial clearance.

16. In the method as claimed in claim 15, including the step of adjusting the location of said stop to its said set position, for selectively establishing said final clearance.

17. In a method on a lawn mower for establishing clearance between cutting edges respectively on two cutting members consisting of a cutting reel and a bedknife and with one of said cutting members being pivotally mounted on a pivot axis for movement of its cutting edge toward and away from the other of said cutting members and with said one of said cutting members having two portions extending to opposite sides of said pivot axis and with its said cutting edge being on one of said two portions a distance from said pivot axis, the improvement comprising pivoting said one of said cutting members into contact with the other of said cutting members to have said cutting edges in contact with each other for establishing an initial clearance between a set location on the other of said two portions and a reference location on the lawn mower and with said set location being at a distance from said pivot axis greater than the firstmentioned said distance, and pivoting said one of said cutting members in the direction away from contact with said other of said cutting members by pivotal movement of said set location through said initial clearance to where said set location abuts said reference location on the lawn mower to thereby have said cutting edges spaced apart in a final clearance.

18. In a lawn mower for establishing clearance between cutting edges respectively on two cutting members consisting of a cutting reel and a bedknife and with one of said cutting members being pivotally mounted on a pivot axis for movement of its cutting edge toward and away from the other of said cutting members and with said one of said cutting members having two portions extending to opposite sides of said pivot axis, and with its said cutting edge being on one of said two portions a distance from said pivot axis, the improvement comprising a control member connected with the other of said two portions at a location on said other of said two portions a distance from said pivot axis greater than the first-mentioned said distance for pivoting said one of said cutting members, a stop on said lawn mower and operatively associated with said control member to present an initial clearance relative to said control member when said one of said cutting members is pivoted into contact with the other of said cutting members which is a non-pivotal cutting member to have the respective said cutting edges in contact with each other, and means for pivoting said one of said cutting members through said initial clearance to move the respective said cutting edges away from each other to thereby establish a final clearance between the respective said cutting edges.

* * * * *